United States Patent [19]

Schaff

[11] 4,035,708
[45] July 12, 1977

[54] STEPPING MOTOR CONTROL CIRCUIT

[75] Inventor: Ulrich Schaff, Erlangen, Germany

[73] Assignee: Siemens Aktiengesellschaft, Munich, Germany

[21] Appl. No.: 561,343

[22] Filed: Mar. 24, 1975

[30] Foreign Application Priority Data

Mar. 26, 1974 Germany .......................... 2414602

[51] Int. Cl.² ........................................ H02K 37/00
[52] U.S. Cl. ................................................ 318/696
[58] Field of Search .................. 318/138, 685, 696

[56] References Cited

U.S. PATENT DOCUMENTS

| 3,560,821 | 2/1971 | Beling | 318/138 |
| 3,626,269 | 12/1971 | Stanley | 318/696 |
| 3,662,245 | 5/1972 | Newell | 318/696 |
| 3,757,193 | 9/1973 | Inaba et al. | 318/696 |
| 3,919,608 | 11/1975 | Usami et al. | 318/696 X |

Primary Examiner—Gene Z. Rubinson
Attorney, Agent, or Firm—Kenyon & Kenyon, Reilly, Carr & Chapin

[57] ABSTRACT

In a control for a stepping motor which is stepped using a timing pulse generator and includes an on-off regulator means are provided to greatly reduce the average power loss of the motor when at a standstill by lowering the winding current from its nominal value to a substantially lower holding value when the motor is stopped.

8 Claims, 4 Drawing Figures

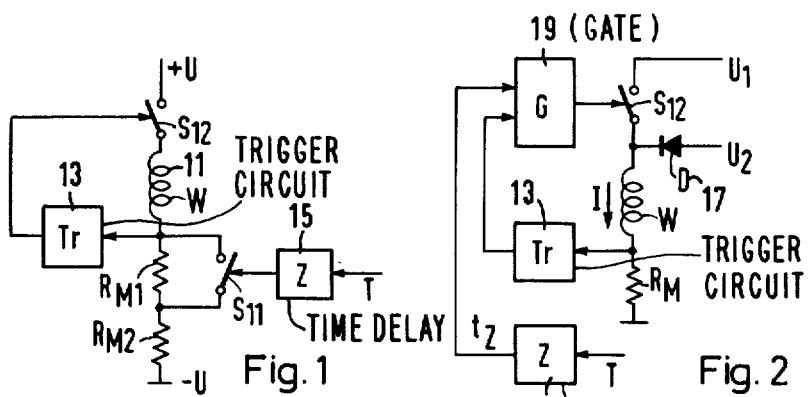
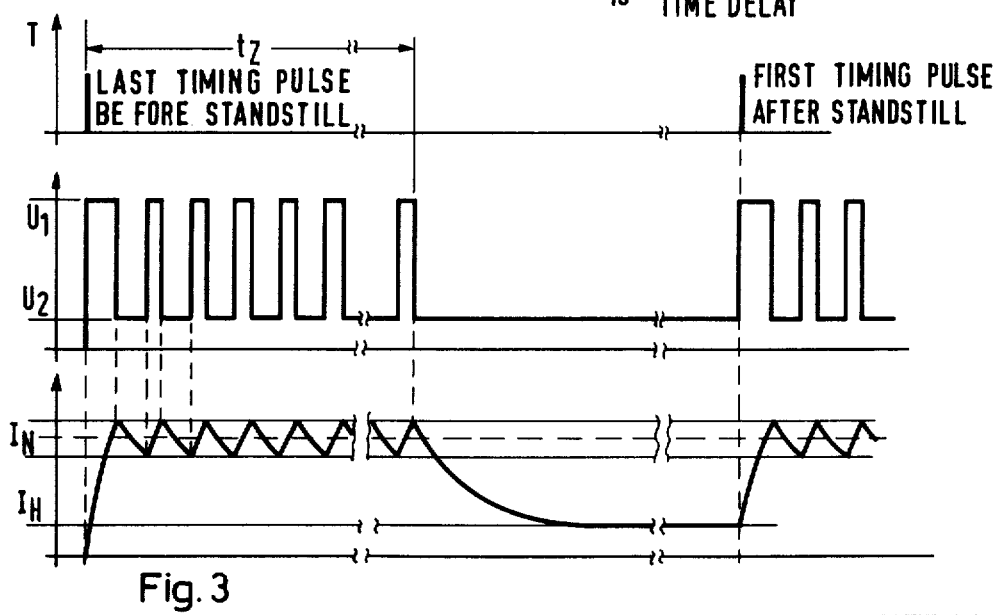
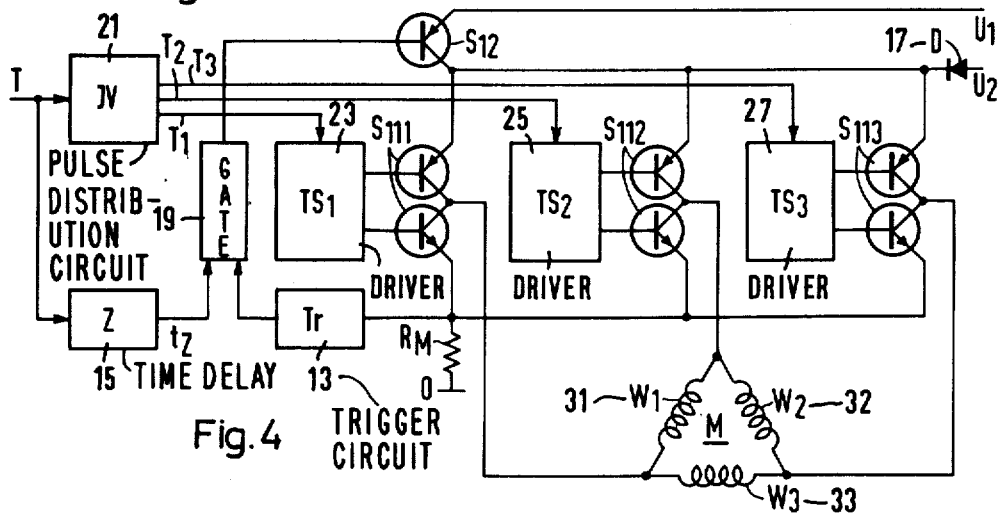

STEPPING MOTOR CONTROL CIRCUIT

BACKGROUND OF THE INVENTION

Different principles are known for driving stepping motors of a variety of winding types. These principles are summarized in an article in the publication "Computer Design" Mar. 19, 1971 entitled "Drive System for Small or Large Angle PM Stepping Motors " by Thomas E. Beling. In this paper, six possibilities for control are mentioned. The first is as follows:
1. The motor operating voltage for the stepping drive is selected that with the winding resistance nominal current occurs. This, however, results, in a relatively great time constant. The remaining possibilites are designs which obtain as steep a current rise as possible. To accomplish this they use operating voltages substantially higher than the nominal voltage which would be called for to obtain a nominal current at a give winding resistance. In such cases the winding current must be limited. Thus, in each of the remaining cases an excess or overvoltage is employed and the control schemes deal with means for limiting the current. These are as follows:
2. A series resistance is used for the limiting the current. The major disadvantage of this is a high power loss.
3. The current is limited by a series control. This also leads to a high power loss.
4. An on-off or chopper regulator is provided.
5. A bi-level drive is used in which the voltage is switched between two operating voltages $V_1$ and $V_2$ of different magnitude. The higher operating magnitude is used to overexcite the motor initially and after a constant time is switched to a lower $V_2$ which is equal to the nominal current times the winding resistance, i.e. $I_N \times R_L$ through the use of a time delay stage, and
6. A bi-level system is used in which, upon reaching the nominal current the higher voltage $V_1$ is switched to the lower voltage $V_2$ through the use of a trigger and the nominal current then flows in the windings.

Of the above noted possibilities (4 ) – (6 ) have a lower power loss than the earlier possibilities and are therefore preferable.

However, to reduce the average power loss still further it is required that during standstill or stopping of the motor i.e. during control pulse interval, the motor winding current be reduced to the point where it is equal only to that necessary to generate a holding torque for the motor. This is particularly important where a great number of such motors and drives with stepping motors are used in a system. The required holding current for a stepping motor is considerably smaller than the nominal current since it is used only to suppress an accidental angular displacement of the motor during the control pulse intervals. It is necessary, however; if a holding current was not present the motor could be moved slightly.

SUMMARY OF THE INVENTION

The present achieves such further reduction in power by reducing the power during to that required for holding. More specifically, the circuit of the present invention starts out with conventional on-off control in which the motor winding is coupled to achieve a steep current rise initially after which the motor winding current is held at a nominal value during the pulsed interval when the motor is being driven. This is accomplished by a comparator or threshold detector in the on-off regulator. In accordance with the present invention means are provided monitoring the pulsing of the motor, which means, upon the discontinuation of pulses, provide an output to reduce the current being supplied to the windings of the motor such as to only maintain the required current value for holding.

Preferably the monitoring circuit will include means having a time delay which is set to be greater than the interval between two pulses. If this time period is exceeded and a pulse has not detected, an output from the monitoring circuit reduces the response threshold value in the on-off regulator such that the current flow through the motor winding is limited or regulated to the holding current value.

As disclosed, a monostable vibrator may be used in the monitoring circuit. Such a multi-vibrator can arranged so as to be retriggered with each successive timing pulse such that only when the pulses are discontinued for the required period of time will its output change. In a disclosed embodiment the output of the monostable is used to vary the magnitude of a measuring resistance connected to the supply voltage in series with the current winding of the motor. The voltage drop of the measuring resistor is provided as a threshold value input to a trigger stage in the on-off regulator.

In a first embodiment the desired current reduction to a holding current which is the below the nominal current is obtained using a single voltage source which supplies the overvoltage. In this embodiment the voltage is supplied through a switch which is controllable by a trigger circuit. The motor winding and two measuring resistors are placed in series across the voltage source with one of the measuring resistors arranged so that it can be short-circuited using another switch controlled by the output of the time delay means, i.e. the monostable multi-vibrator.

In accordance with a second embodiment the desired current reduction is accomplished through the use of two separate voltage source to supply power to motor windings. One of these is of a value which supplies an overvoltage and is supplied to the motor winding through a first switch which is controllable through the use of a gate. The gate has as an enabling input the output of the time delay means and will be enabled as long as it does not change state indicating an interruption of pulses. The second gate input is from the trigger means of the on-off regulator. A second lower voltage source is coupled to the winding through a diode, the diode being back biased with respect to the higher voltage source. In this embodiment a single measuring resistor is used for providing a input to the trigger means. With this embodiment the on-off regulating circuit which responds to the triggering means to open and close the switch will operate only as long as pulses are being detected. Should the motor come to a standstill the time delay means will disable the gate and the lower voltage will become effective. The lower voltage will of course be such as to establish the necessary holding current in the motor windings.

BRIEF DESCRIPTION OF THE DRAWINGS

FIG. 1 is a block-circuit diagram of a first embodiment of the present invention.

FIG. 2 is a block-circuit diagram of a second embodiment of the present invention.

FIG. 3 is a timing diagram helpful in understanding the operation of the circuit of FIG. 2.

FIG. 4 is a logic-circuit diagram of the system of FIG. 2 in more detail and also illustrating the manner of controlling a plurality of windings.

DETAILED DESCRIPTION OF THE PREFERRED EMBODIMENT

FIG. 1 illustrates a first embodiment of the present invention. In series across voltage sources designated +U and −U are the motor winding 11, a switch S12 and two measuring resistances designated $R_{M1}$ and $R_{M2}$. The voltage present at the junction between the measuring resistor $R_{M1}$ and the winding W is provided as an input to a trigger circuit 13 which has an output controlling the swtich S12. The total voltage developed across the series circuit will be greater than the voltage required to cause a nominal current flow through the winding W. As will be more fully described below, the switch S12 will preferably be a semiconductor switch such as a transistor. The trigger circuit 13 can simply be a comparator set to trigger at a voltage corresponding to the nominal current for the winding 11 to open the switch S12. The manner in which this portion of the circuit operates can be seen from the left hand side of FIG. 3. (FIG. 3 relates directly to the circuit of FIG. 2 to be explained below. However, since the principles of principles of operation are similar, it is also helpful in understanding the circuit of FIG. 1.) The upper-most curve designates timing pulses or drive pulses for the stepper motor, the middle curve the switching pulses for the stepper motor and the lower curve, the current through the winding W. The curves of FIG. 3 are for the circuit of FIG. 2. Thus, although the voltages $U_1$ and $U_2$ are shown on the second curve the steps can equally well be thought of as being a change between the voltage existing between +U and U zero volts. The portion of the circuit thus far described relates to the type on-off regulator known in that art. Assuming the winding was not previously energized, an appropriate timing pulse results in such energization, the switch S12 being closed and the full voltage being applied across the series circuit. The current increases as illustrated on the bottom-most FIGURE until current $I_N$ or a current slightly above that is detected by the trigger 13 whereupon the switch S12 is opened. The current then decays until it passes though the threshold of the trigger circuit whereupon the switch S12 is again closed. The operation continues so that, after the initial period where an overvoltage was applied to cause a fast current rise and small time delay in motor positioning, an average current equivalent to the nominal current is provided because of the averaging of the many small steps.

In the prior art, a waveform such as that on the left hand portion of FIG. 3 resulting in an average $I_M$ would have been present even when the motor was at a standstill. However, only the current designated as $I_H$ is necessary to hold the motor once it has been positioned and timing pulses are no longer being received. Thus, in accordance with the present invention, time delay means 15 having as an input the pulses T is provided. In the embodiment of FIG. 1 the output of time delay means 15 is used to operate a switch S11 which is in parallel across the one measuring resistor $R_{M1}$. The time delay circuit 15 will preferably a monostable multi-vibrator. This monstable multi-vibrator is triggered by the timing pulses and has a time delay such that as long as the timing pulses continue, it will not change its output state. That is to say, it will be set to have a time delay, preferably greater than the period between timing pulses so that when timing pulses top it changes its state, to open the switch S11 and place the resistor $R_{M1}$ in the circuit. Thus, the resistor $R_{M2}$ will always be in the circuit and the voltage developed across this resistor will determine the triggering level of the trigger circuit. To reach a given voltage level will require a certain magnitude of current. However, when the two resistors are placed in series, a smaller level of current will be required to reach the same triggering voltage. Thus, once the switch S11 is opened indicating that the motor is at a standstill the waveform will be reduced to a level having an average value $I_H$. That is to say the waveform will have a shape the same as the waveform of the left hand side of FIG. 3 but the voltage will be turned on and off to establish an average current about the line $I_H$ rather than the line $I_N$.

FIG. 2 illustrates a second embodiment of the present invention utilizing two separate power supplies. The power supply $U_1$ is equivalent to the voltage impressed across the series circuit of FIG. 1. The voltage $U_2$ is the voltage required to establish the current $I_H$, i.e. the holding current through the winding. The lower voltage $U_2$ is isolated from the higher voltage by means of a diode 17 having a polarity in the direction of the current flow through the winding. Once again, the higher voltage is connected through a switch S12 to the winding which has in series with it a measuring resistor $R_M$. As in the previous embodiment the measured voltage is used as an input to a trigger circuit 13. Once again a time delay means 15 are provided. However, in this case the output of the time delay means 15, again preferably a monostable multi-vibrator, is used as an enabling input to a gate 19 which performs an AND function. The output is arranged so as to enable the gate as long as pulses are being detected at the input of the 5. In other words, as long as the period between pulses does not exceed a time $t_z$ corresponding to a period somewhat greater than the normal time between timing pulses. Operation during this period will be as shown on the left hand side of FIG. 3 and explained above. That is, in response to the sensed voltage across the measuring resistor $R_M$, the output of the trigger circuit 13 will alternately open and close the switch S12 to establish an average current $I_N$ through winding 11. However, should the period between pulses exceed the time $t_z$ the monostable multi-vibrator will reach the end of its delayed time and will change state. The gate 19 will now become disabled causing the switch S12 to remain opened and the voltage across the winding 11 rather than changing between the voltages $U_1$ and $U_2$ will remain at the voltage $U_2$, the voltage necessary to maintain the necessary holding current $I_H$. During this time the motor is at a standstill. Once timing pulses start again to drive the motor, as soon as the first timing pulse is detected by the time delay means, i.e. as soon as the multi-vibrator is set by such a pulse, the gate 19 will again be enabled and operation such as that at the left hand side of the FIGURE where the voltage alternates between voltage $U_1$ and $U_2$ will again take place as illustrated.

FIG. 4 illustrates in more detail a circuit according to the present invention for use in a motor having three separate windings 31, 32 and 33. The circuit shown on FIG. 3 includes a pulse distribution circuit 21 which has as inputs the timing pulses T and which provides pulse outputs designated T1 through T3 to driver stages 23, 25 and 27. The drivers 23, 25 and 27 respectively drive transistor pairs S111, S112 and S113 which are in a push-pull configuration. This is a conventional circuit for driving a stepper motor. It will be recognized that the motor windings 31, 32, and 33 which are in a delta configuration must be sequentially energized to cause the rotor to step around. Thus, initially the top transistor of the group S111 will be turned on to cause voltage to flow therefrom through the winding 31. At the same time, the bottom transistor of the group 112 will be turned on to form a return path through the measuring resistor $R_M$. In response to the next pulse, a return path might be established through the lower transistor S113 causing current to flow through the winding 33 and cause a rotation of the vector of the windings by 60°. Then with the same return path the upper transistor S112 will be energized and the lower transistor S112 turned off to establish a current path the winding 32. Thereafter, with the voltage being supplied through the upper transistor 112 the return path will be provided through the lower transistor S111 rather than S113 to obtain another 60° rotation. In this manner, the switching continues in well known fashion to cause a stepping of the motor. The voltage supply to the upper transistors in each of the push-pull pairs is accomplished in the same manner as indicated on FIG. 2. That is to say the voltages $U_1$ and $U_2$ are provided, the voltage $U_2$ being supplied through a diode 17 as before. The switch S12 is shown in the form of a transistor having its base coupled to the output of the gate 19. The arrangement of this time delay means 15 and the trigger circuit 13 is exactly as described above.

The circuit of FIGS. 2 and 3 has a particular advantage in that it is potentially quieter than the arrangement of FIG. 1. This is because of the fact that using an arrangement such as that in FIG. 1 results in oscillation about the holding current. Thus, mechanical vibrations and perceptive acoustical noise such as singing or whistling may take place when that embodiment is used. This type of noise also exits during the running period, i.e. when the current and voltage are oscillating to obtain an average nominal current. However, during such operations this noise is drowned out by other noises. However, during motor standstill, i.e. while holding current only is being maintained by the on-off regulator, the acoustical signals developed can be disturbing particularly if the stepping motor is used in an office machine or the like. Because of that, the embodiments of FIGS. 2 and 3 where the holding current is a steady value rather than an oscillation about the desired holding current is preferable.

It will be recognized that various modifications may be made to the disclosed embodiments. For example, in FIG. 1, rather than using a pair of measuring resistors and shorting one out, the output of the time delay circuits can be used to switch threshold in the triggering circuit, i.e. to lower the threshold at which it operates when the time delay means indicates a standstill. These and other modifications may be made without departing from the spirit of the invention which is intended to be limited solely by the appended claims.

I claim:

1. In a stepping motor circuit arrangement in which an on-off regulator responsive to timing pulses is used to supply an overvoltage to the motor windings to obtain a steep current rise, the on-off regulator including a trigger circuit having an input proportional to sensed current through the motor windings and having an output which switches the overvoltage on and off so as to maintain an average nominal current through the winding, the improvement comprising means to detect the absence of timing pulses and to develop an output indicative thereof and means coupled to said output reduce the current in the motor winding to the value necessary for holding.

2. Apparatus according to claims 1 wherein said means to detect comprise time delay means having a time delay which is greater than the time interval between two timing pulses and adapted to change its output signal if a timing pulse is not again received upon expiration of said time period and wherein said means to reduce means responsive to the change in output of said first means to cause said trigger circuit to respond to a lower threshold corresponding to the holding current.

3. Apparatus according to claim 2 wherein said means to detect comprise a monostable multi-vibrator having said time delay and wherein said multi-vibrator is coupled to be triggered by each successive timing pulse so that its output changes state only when a timing pulse is not received within said time interval.

4. Apparatus according to claim 1 wherein said trigger circuit is responsive to a voltage obtained from a measuring resistor in series with the winding and wherein said means to reduce comprise means to change the magnitude of the measuring resistor.

5. Apparatus according to claim 4 wherein said motor is supplied for a single voltage coupled through a switch is controlled by said trigger means, said winding and switch having a series therewith first and second measuring resistors and wherein said means for changing resistance comprise a further switch coupled in parallel across one of said measuring resistors and responsive to the output of said time delay means.

6. Apparatus according to claim 1 wherein said means to detect comprise time delay means responsive to timing pulses and arranged to change its output if a timing pulse does not occur within a predetermined time; and wherein said means to reduce comprise:
  1. a first voltage source having a value greater than that necessary to establish a nominal current through said winding;
  2. a switch coupling said voltage source to one side winding;
  3. a second voltage source of a lower value;
  4. a diode coupling said voltage source to said one side of winding;
  5. a measuring resistor coupling the other side of said winding to ground;
  6. the junction of said measuring resistance and said winding coupled to the trigger circuit, the output of said trigger circuit coupled to and controlling said switch; and
  7. a gate interposed between said trigger circuit and said switch, said gate having as its enabling input the output of said means to detect.

7. Apparatus according to claim 6 wherein the voltage supplied by said second voltage source is an undervoltage which will result in a current flowing through said winding equall to the holding current for said motor.

8. Apparatus according to claim 7 said means to detect comprise a monostable multi-vibrator having said predetermined time delay and wherein said multi-vibrator is coupled to be triggered by each successive timing pulse so that its output changes state only when a timing pulse is not received within said predetermined time interval.

* * * * *